May 5, 1953

N. F. ANDREWS 2,637,436

HARVESTER GATHERER BELT

Original Filed June 9, 1947

INVENTOR.
N. F. Andrews
BY
C. F. Parker
Attorneys

Patented May 5, 1953

2,637,436

UNITED STATES PATENT OFFICE 2,637,436

HARVESTER GATHERER BELT

Norman F. Andrews, Ankeny, Iowa, assignor to Deere & Company, Moline, Ill., a corporation of Illinois Original application June 9, 1947, Serial No. 753,437. Divided and this application July 17, 1950, Serial No. 174,339

4 Claims. (Cl. 198—171)

1

This invention relates to a material-advancing belt or the like for use in corn harvesters. More particularly, the invention relates to an improved gathering belt or device for the gathering mechanism of a corn picker.

This application is a division of my co-pending application, Serial No. 753,437, filed June 9, 1947, now Patent No. 2,571,811, October 16, 1951.

In a corn harvester, of which the corn picker is typical, gathering mechanism is provided for moving stalks rearwardly between a pair of snapping rolls as the machine advances along the field. Heretofore, it was conventional to utilize such mechanism as a plurality of chains trained about sprockets spaced apart along the path along which the stalks and corn were advanced in the gathering and snapping operation. Mechanism of this type is characterized by positive, noisy and troublesome operation. The positive drive between the sprockets and chains means that, in the event that an obstacle is encountered, the chain will break before it will yield, or one of the metallic gathering lugs rigidly secured to the chain would break. After a little use of this mechanism, the sprockets and chains would wear, giving rise to excessive rattling and hammering. Further, because of the relative lack of resilience in the chains, it is difficult to provide automatically adjustable idlers, so that as the chains wear they become loose and often slip the sprocket, which requires that the mechanism be stopped, the chains replaced and suitable adjustment made.

Recognizing these disadvantages, the principal object of the present invention is to provide a gathering or material-handling belt that is flexible, quiet, adapted to slip under extreme conditions, and one that lends itself readily to automatic take-up idler mechanism. To this end, a preferred embodiment of the invention comprises an endless belt having a plurality of corn-engaging lugs thereon. It is a feature of the invention to provide the belt of molded rubber or rubber-like material with the lugs integrally molded or otherwise integrally formed therewith. A still further feature of the invention is to utilize for the shape of the belt the conventional V-belt so that the belt has external sheave-engaging sides that slope or converge inwardly. A still further object of the invention is to provide a flexible belt of rubber or rubber-like material having therein reenforcing material considerably more stretch-resistant than the belt material. In this respect, it is a further feature to utilize a part of this additional material for the reenforcement of the lugs.

The foregoing and other important objects and desirable features inherent in and encompassed by the invention will become apparent from the following detailed description and drawings of a preferred embodiment of the invention.

The typical corn-picker construction illustrated comprises a pair of gatherer points 10 and 12 between which is provided a longitudinally extending passage 14 in which stalks and ears of standing corn are received as the picker advances in the direction of the arrow A along a row of stalks the centerline of which is designated by the letter R.

A pair of snapping rolls 16 and 18 are carried in the passage 14 for rotation toward each other or in the direction of the arrows B and C. As the stalks are received in the passage 14, they enter in the space between the snapping rolls 16 and 18. These rolls, rotating as aforesaid, force the stalks downwardly, pinching or snapping off ears of corn. The corn drops from the snapping rolls to suitable conveying mechanism (not shown) for ultimate transfer to a point of discharge.

Figure 1:
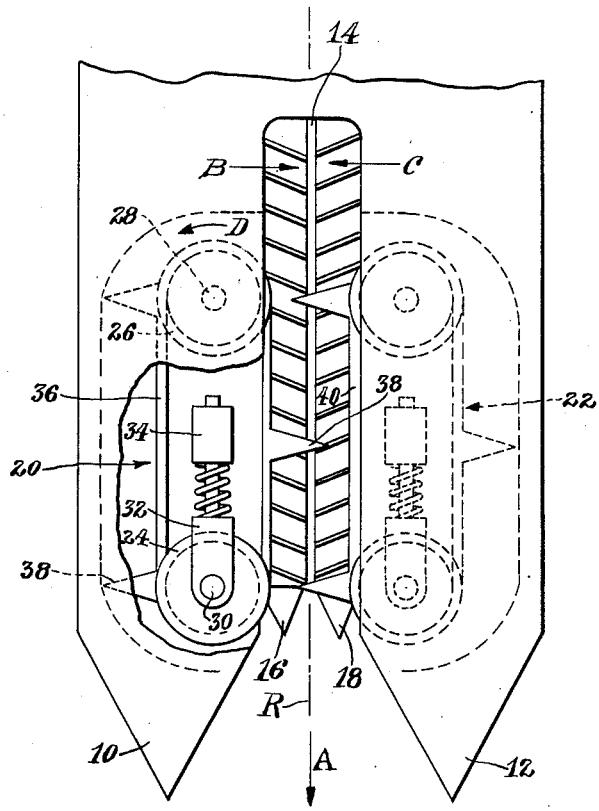
Figure 1 is a fragmentary plan view of a forward portion of a corn harvester of the corn-picker type, a portion of the view being broken away to expose internal parts.

Each of the dividers 10 and 12 is provided with gathering mechanism, designated generally by the numerals 20 and 22 respectively. Since these are identical, only one will be described, particular reference being had to the mechanism 20, since a portion thereof is exposed in Figure 1.

This mechanism comprises a pair of sheaves 24 and 26 spaced apart fore and aft, or in the direction along which the corn is advanced. The sheave 26 is rotatably mounted on a fixed shaft 28. The sheave 24 is carried on a stub shaft 30 which in turn is carried in a yoke 32 of a spring-loaded automatic take-up mechanism 34. The gathering element comprises a flexible endless belt 36 trained about the sheaves 24 and 26 and provided with a plurality of corn-engaging lugs 38. The upper sheave 26 may be supplied with power from any appropriate source (not shown) so that the sheaves rotate in the direction of the arrow D, whereby the inner run of the belt will travel rearwardly or in the direction of movement of the corn through the passage 14.

For the purposes of identification, the belt on the gathering mechanism for the other divider 12 is designated generally by the numeral 40. No other reference will be had to this belt, since, as aforesaid, both belts are identical.

Figures 2, 3:
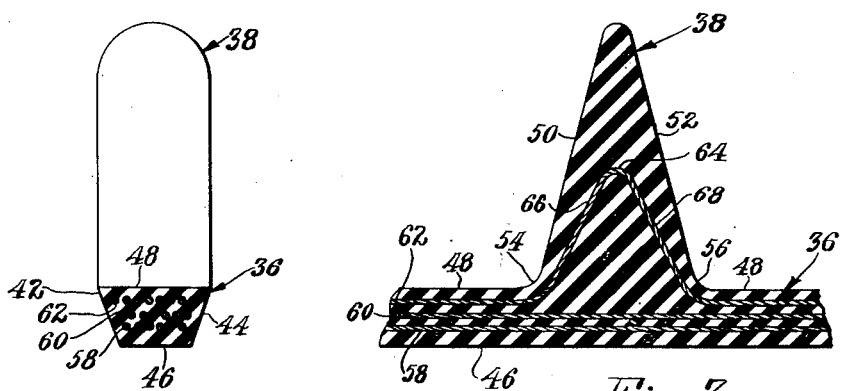
Figure 2 is an enlarged transverse sectional view of the belt.
Figure 3 is an enlarged fragmentary longitudinal section of the belt.

The details of the structure of the belt 36 are best shown in Figures 2 and 3. The belt is relatively thin and narrow and is composed of rubber or rubber-like material and the fixation of the lugs 38 to the belt is accomplished preferably by integrally molding the belt and lugs. For the purpose of accomplishing quietness in operation, at least the external sheave-engaging portions of the belt are of rubber-like material or equivalent material having the characteristic of noise-free operation. The outer or external sheave-engaging portions of the belt are designated by the numerals 42 and 44. Thus the belt has the form of a truncated triangle, the opposite sides or portions 42 and 44 sloping or converging inwardly. The inner surface of the belt is designated at 46 and the upper or outer surface at 48. Each of the lugs is in the form of an isosceles triangle having a relatively high altitude, on the order of four times the thickness of the belt, so that the sides, designated at 50 and 52, slope or converge outwardly to the apex of the triangle. Thus, the outer portion of the lug is relatively flexible and the base of the lug is thickened at its junction with the belt, thus placing the greater portion of material where needed. The junctions of the sides 50 and 52 with the outer or top portion 48 of the belt are provided respectively as fillets 54 and 56 to relieve the belt of stresses at this point. Thus, the lugs are not easily torn off from the body of the belt.

It is proposed with a belt of this type that appropriate V-belt sheaves will be utilized. Therefore, the necessary driving friction will be available. At the same time, the belt can slip in the event that an obstruction is encountered. As the belt wears during use, the automatic take-up mechanism 34 will accommodate the belt to its new length, thus eliminating jumping of the sheaves as is one of the characteristics of sprocket and chain assemblies utilized in the past.

A further feature of the invention is the reenforcing of the rubber-like belt with material that is more stretch-resistant than is the material of which the belt is composed. Preferably, the stretch-resistant material takes the form of a plurality of layers of cords 58, 60 and 62 of fabric or other suitable material. Each of the cords in each layer is preferably, but need not be, endless and reenforces the belt against undue stretching. The outer layer 62 may be looped outwardly at 64 to extend into a lug for the purpose of reenforcing the lug with respect to the belt. As shown in Figure 3, the loop is in the form of a V having outwardly converging legs 66 and 68 which meet at a point approximately one-half the altitude of the triangular lug. The V-shaped loop is therefore concentrated near the base of the lug, adding to its strength of attachment to the belt and leaving the outer portion of the lug relatively flexible. The points at which the cord 62 extends or loops out into the V lie relatively close to the fillets 54 and 56, contributing further to the reenforcement of the structure against tearing of the lugs from the belt.

Other features of the invention not particularly enumerated herein will undoubtedly occur to those versed in the art, as likewise will numerous modifications and alterations in the preferred form of the invention illustrated, all of which may be achieved without departing from the spirit and scope of the invention as defined in the appended claims.

What is claimed is:

1. For a corn harvester having corn-advancing mechanism including a pair of sheaves spaced apart lengthwise of the path along which the corn is advanced: a corn-handling element comprising an endless flexible belt to be looped about the sheaves and including a plurality of lugs fixed thereon and projecting outwardly therefrom, characterized in that said belt is composed of rubber-like material, the lugs are of the same material and integral with said belt, said belt is tensionally reenforced by a plurality of layers of material different from the belt and lug material, the material of at least one of said layers being substantially more stretch-resistant than the belt and lug material, and at least one of said layers being extended outwardly into each of the lugs.

2. For a corn harvester having corn-advancing mechanism including a pair of sheaves spaced apart lengthwise of the path along which the corn is advanced: a corn-handling element comprising an endless flexible belt to be looped about the sheaves and including a plurality of lugs fixed thereon and projecting outwardly therefrom, characterized in that said belt and lugs are integrally composed of rubber reenforced by a plurality of endless cords of stretch-resistant material, certain of said cords being looped outwardly into the lugs.

3. A belt as defined in claim 2, further characterized in that: each lug is in the form of a triangle of relatively high altitude having its base at the belt, and each of said loops of cord extends in the form of a V converging toward the apex of the respective lug.

4. A belt as defined in claim 3, further characterized in that: each of said V-shaped loops has leg portions lying relatively close respectively to the junctions of the belt and the sides of the respective lug so as to reenforce said junctions, and the outward extent of each of said loops being approximately one half the altitude of a lug so as to leave the outer portion of the lug relatively flexible.

NORMAN F. ANDREWS.

References Cited in the file of this patent

UNITED STATES PATENTS

| Number | Name | Date |
|---|---|---|
| 2,189,049 | Ungar | Feb. 6, 1940 |
| 2,276,978 | Hyman | Mar. 17, 1942 |
| 2,305,044 | Toews | Dec. 15, 1942 |
| 2,480,209 | Aasland | Aug. 30, 1949 |
| 2,514,429 | Waugh | July 11, 1950 |